(12) United States Patent
Jaaskelainen et al.

(10) Patent No.: US 9,891,121 B2
(45) Date of Patent: Feb. 13, 2018

(54) ATTACHMENT METHOD TO KEEP OPTICAL FIBER IN TENSION

(75) Inventors: Mikko Jaaskelainen, Katy, TX (US); Ian Bradford Mitchell, Austin, TX (US); Michel Joseph LeBlanc, Hoouston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 1605 days.

(21) Appl. No.: 13/480,197

(22) Filed: May 24, 2012

(65) Prior Publication Data
US 2013/0315552 A1 Nov. 28, 2013

(51) Int. Cl.
| G02B 6/00 | (2006.01) |
| G01L 5/00 | (2006.01) |
| G01D 5/353 | (2006.01) |
| G01L 1/26 | (2006.01) |

(52) U.S. Cl.
CPC ............ G01L 5/0033 (2013.01); G01D 5/353 (2013.01); G01L 1/26 (2013.01)

(58) Field of Classification Search
CPC ............... G02B 6/3887; G02B 6/4401; G02B 6/02209; G02B 6/0218; G02B 6/3855; H02G 1/04; G01L 5/003; G01L 1/26; G01D 5/353; B65H 75/02; B65H 75/08; B65H 75/30
USPC ............ 254/134.3 R; 385/137, 138, 136, 81; 73/800
See application file for complete search history.

(56) References Cited

U.S. PATENT DOCUMENTS

| 6,396,994 B1* | 5/2002 | Philipson ............... G02B 6/022 250/227.14 |
| 6,535,684 B1* | 3/2003 | Kondo ................. G02B 6/3612 385/137 |
| 6,584,269 B1* | 6/2003 | Mitchell .................. G01N 3/04 242/920 |
| 6,754,416 B1* | 6/2004 | Mitchell ............ G02B 6/02123 385/123 |
| 7,286,742 B2* | 10/2007 | Shibata ............ G01R 31/31905 385/135 |
| 2005/0053350 A1* | 3/2005 | Hodge ................. G02B 6/4457 385/134 |
| 2006/0285813 A1* | 12/2006 | Ferguson ............... G01B 11/16 385/138 |
| 2010/0296792 A1* | 11/2010 | Bannister ............. G02B 6/3829 385/136 |
| 2012/0257475 A1* | 10/2012 | Luscombe et al. ............. 367/25 |
| 2013/0139606 A1* | 6/2013 | Swinehart .......... G02B 6/02209 73/800 |
| 2014/0180592 A1* | 6/2014 | Ravi et al. ...................... 702/12 |
| 2014/0191120 A1* | 7/2014 | Donderici et al. ............ 250/265 |
| 2014/0191761 A1* | 7/2014 | San Martin et al. ......... 324/339 |

OTHER PUBLICATIONS

LeBlanc, Michel J.; "Study of Interfacial interaction of an optical fibre embedded in a host material by insitu measurement of fibre and displacement—Part I. Theory". Smart Mater. Struct. 14 (2005) pp. 637-646.

* cited by examiner

*Primary Examiner* — Christopher M Koehler
*Assistant Examiner* — Joel Crandall
(74) *Attorney, Agent, or Firm* — Gilliam IP PLLC (57) ABSTRACT

A method using a capstan device and different bonding methods for minimizing undesirable time-dependent effects that occur in sensing devices that use optical fibers placed in tension.

8 Claims, 8 Drawing Sheets

ATTACHMENT METHOD TO KEEP OPTICAL FIBER IN TENSION

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This disclosure relates generally to optical fibers used as sensing devices and, more particularly, to methods for improving the long term stability of sensing devices that are based on placing optical fibers in tension.

BACKGROUND OF THE INVENTION

Fiber-optic sensors are increasingly being used as devices for sensing some quantity, typically temperature or mechanical strain, but sometimes also displacements, vibrations, pressure, acceleration, rotations, or concentrations of chemical species. The general principle of such devices is that light from a laser is sent through an optical fiber and there experiences subtle changes of its parameters either in the fiber or in one or several fiber Bragg gratings and then reaches a detector arrangement which measures these changes.

The growing interest in fiber optic sensors is due to a number of inherent advantages:
Inherently safer operation (no electrical sparks)
Immunity from EMI (electromagnetic interference)
Chemical passivity (not subject to corrosion)
Wide operating temperature range (wider than most electronic devices)
Electrically insulating (can be used in high voltage environment)

In many applications, the sensor is devised in such a way that the parameter of interest, for example, pressure, is converted into mechanical strain in the fiber. To maintain the accuracy of the sensor, it is necessary that the attachment of the fiber to the device be strong and reliable. Any slippage of the fiber within its mount, or any creep of the bonding material if one is used, will change the output of the sensor and be the source of error. There is a need for reliable methods to mount the optical fiber on strain-based sensing devices. Because many devices depend on keeping the fiber sensing element in tension, there is a need to maintain the fiber in tension such that slippage and other deleterious effects are avoided or minimized.

BRIEF SUMMARY OF THE INVENTIVE CONCEPT

The need is met with a method for maintaining an optical fiber in tension on any device including at least the steps of: providing a semi-circular or cylindrical shape that acts as a capstan on the part of the device on which the fiber is mounted; and providing a separate force at the end of the fiber to maintain it in tension.

In another aspect the step of providing a separate force is provided by bonding the fiber onto the capstan cylinder.

In another aspect of the bonding the fiber is bonded over the first 180 degrees of the capstan.

In another aspect the step of providing a separate force is provided by bonding the fiber onto a separate support after some length of fiber has been wrapped over the capstan cylinder.

In another aspect the step of providing a separate force is provided by a clamp used to hold the fiber with a transverse force onto the capstan.

In another aspect the step of providing a separate force is provided by a clamp used to hold the fiber with a transverse force onto a separate support after some length of fiber has been wrapped over the capstan cylinder.

In another aspect the step of providing a separate force is provided by a clamp used to hold the fiber with a transverse force onto the capstan in which an interlayer material between the capstan and the clamp, the CTE and thickness of which can be selected based on the thermal response of the clamp.

DETAILED DESCRIPTION OF THE INVENTION

In the following detailed description, reference is made accompanying drawings that illustrate embodiments of the present invention. These embodiments are described in sufficient detail to enable a person of ordinary skill in the art to practice the invention without undue experimentation. It should be understood, however, that the embodiments and examples described herein are given by way of illustration only, and not by way of limitation. Various substitutions, modifications, additions, and rearrangements may be made without departing from the spirit of the present invention. Therefore, the description that follows is not to be taken in a limited sense, and the scope of the present invention is defined only by the appended claims.

Figure 1:
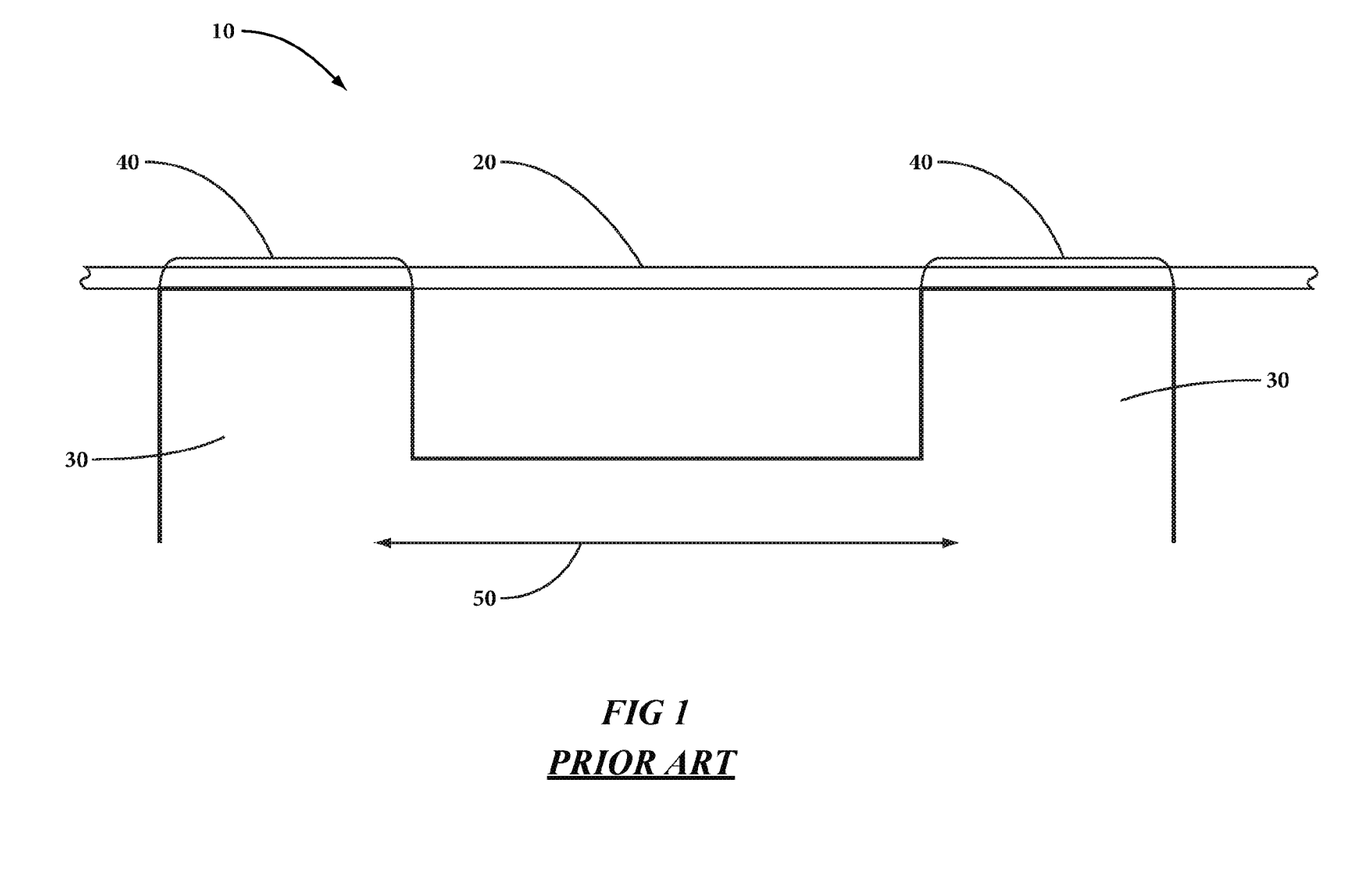
FIG. 1 illustrates an optical fiber held in tension by a device.

FIG. 1, exhibits a typical situation 10 related to this invention where an optical fiber 20 is held in tension between two supports 30. Fiber 20 in this case is attached to supports 30 by a bonding material 40. In a typical application, the device holding the fiber is a sensing device that will increase or decrease the separation between the supports in relation to a parameter being measured. In this example the device may be a diaphragm that is placed under greater or lesser strain depending on the pressure in the cavity being capped by this diaphragm. In the illustration, an increase of pressure below the device would result in an increased strain in the diaphragm that would then deform and increase the separation 50 between the fiber supports, and this, in turn, would increase the tension in the fiber. Typically, a strain sensing element along the fiber, between the supports, would be interrogated remotely by sending light down the fiber and measuring the properties of the reflected or transmitted light in the fiber. A typical strain sensing element along the fiber can be a Fiber Bragg Grating written in the core of optical fiber 20.

The typical optical fiber made of silica will respond linear elastically to applied loads and will exhibit, on its own, very little creep, visco-elastic and/or visco-plastic response. The main culprits for such effects are the bonding materials 40 (which generally exhibit visco-elastic, plastic and visco-plastic non-linear behavior, especially at high strains and with elevated temperatures) and the various interfaces: between fiber 20 and its coating, between the coating and the bonding material or, for the uncoated fiber case, between the fiber and the bonding material. One option to minimize these effects is to keep the strains very low but this limits the range of operation of the device and does not resolve the dependence on temperature of the material properties. Another option that one might consider is to minimize the amount of bonding material used, and to use thin coating materials so that the non-linear and thermal effects of these materials have a limited impact on the total mechanical performance of the device. However, this option results in large interfacial stresses being present for comparatively small strains transferred to the fiber and can eventually result in interfacial failure, in the form of loss of bond (debonding) or plastic deformation of the coating or of the bonding material due to the large shear stresses present at the interface where strain transfer takes place.

With this invention, we accept and make use of the fact that interfaces may be debonded and configure the device so that efficient strain coupling still takes place in a way that minimizes the undesirable time-dependent effects mentioned above.

The primary fiber coatings used where high-temperature high strain transfer requirements are present are polyimide and metal coatings. It is known that the polyimide coatings have poor adhesion to the optical fiber and that strain transfer between the coating and the fiber occurs most generally via interfacial friction. Such friction is possible because of the large residual stress produced in the coating during its cure. The cure takes place at elevated temperature ($\geq 250°$ C.) and since the optical has a very low coefficient of thermal expansion compared to the polyimide material, tensile hoop stress develops in the coating that produces radially compressive stress at the coating/fiber interface. Many metal coatings of fibers also have poor adhesion to the fiber but here too radial stresses help in obtaining frictional shear strain transfer. The radial stress in metal coated fibers result from the combination of two thermal residual stress: that of the coating itself if deposited on the fiber from a melt, and that caused by the soldering or brazing process when bonding the fiber to the host device. Our invention builds on this and relies on interfacial friction forces for the strain transfer. Furthermore, our invention takes into account the fact that thermal residual stresses are reduced or disappear at elevated temperatures. We also mention here that the invention will be found useful even when the interfaces are fully bonded, because it will act as a precautionary measure and take over if and when debonding does take place. For the same reason, we can furthermore state that the invention will be found useful even for the cases where fiber is first fully bonded along the device and not just at the end supports as represented in FIG. 1. In this case, again as a precautionary measure, the invention will reduce the risk of interfacial failure and will reduce the impact of such failure on the performance of the sensing device if and when such failure occurs.

This is accomplished by the following methodology:
1. The part of the device on which the fiber is mounted is given a semi-cylindrical or cylindrical shape so that it acts as a capstan to transfer tension to the fiber via friction.
2. A capstan requires that a separate force (outside of the capstan effect) be present at the end of the fiber to hold it. This force will be provided by at least one of the following:
    a) The fiber is bonded (by an adhesive, solder or braze) onto the capstan cylinder at one point, preferably including the $\varphi=180°$ position, but even more preferably the fiber should be bonded over the first 180 degrees.
    b) The fiber is bonded (by an adhesive, solder, or braze) onto a support after some length of fiber has been wrapped over the capstan.
    c) Use of a clamp to hold the fiber with a transverse force onto the capstan, preferably including the $\varphi=180°$ position, but even more preferably including the zone $135°\leq\varphi\leq180°$.
    d) Use of a clamp to hold the fiber with a transverse force onto a separate support after some length of fiber has been wrapped over the capstan.
3. To ensure that the fiber tension at the hold point is not lost over the full temperature range of operation, the following additional elements can be added:
    a) A small section of the fiber can be stripped of its coating and bonded using a separate adhesive (such as a high temperature epoxy).
    b) An interlayer can be added to the clamp, such interlayer having a coefficient of thermal expansion (CTE) greater than the material used for the main clamp cover. The purpose of this layer is to ensure that the clamping force is not reduced as the temperature is increased. The thickness of this layer needs to be optimized so that the device also works at low temperatures. An interlayer chosen so that the effective thermal expansion of the clamp in the transverse direction where the force is acting matches that of the optical fiber would be a good choice.
    c) Use of a clamp cover that has a higher CTE than the mounting screws used to mount the clamp cover in order to optimize the transverse thermal response of the clamp. (Here care needs to be taken that in-plane stresses and deformations do not cause additional problems.)

Figure 2:
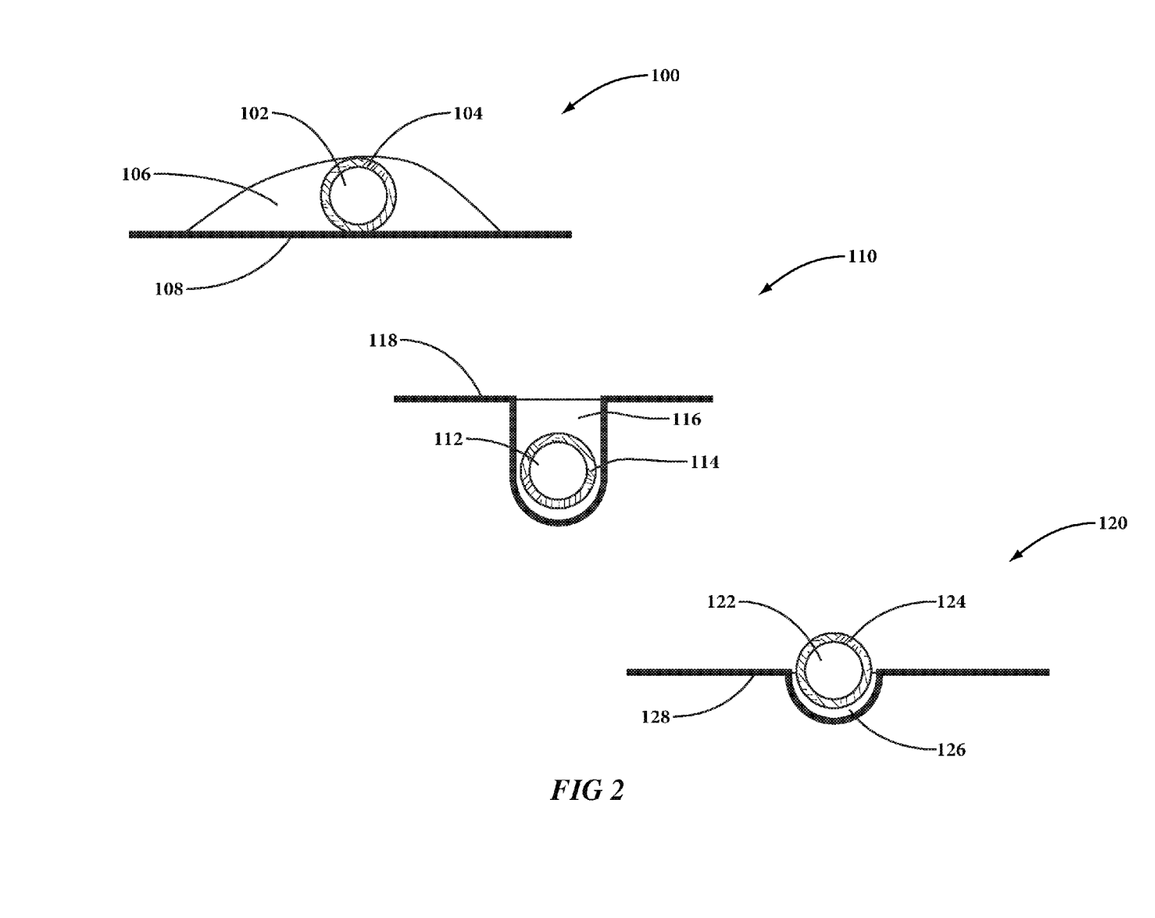
FIG. 2 exhibits different approaches to bond an optical fiber to a device.

For all these configurations, the configurations shown in FIG. 2 may be used where contact between the device and the optical fiber is needed. The first, simplest approach is shown in configuration 100 in which the fiber 102, with coating 104 is attached to surface 108 with a bonding material 106. The next two examples, configurations 110 and 120, involve the use of a groove. In configuration 110 fiber 112, with coating 114 is aligned within a deep grove and held with bonding material 116. In configuration 120 fiber 122, with coating 124 is aligned in a shallow grove and held with bonding material 126. Here, by "deep groove" we mean one that has a depth greater than the diameter of the coated fiber. Grooved approaches do offer advantages in protecting the fiber, ensuring fiber alignment, and distributing stresses more uniformly around the optical fiber. Bonding material may be omitted in regions where the bonding is not needed. A shallow groove such as in configuration 120 permits the use of a simple clamp cover to apply transverse force on the fiber. The bonding in any of these configurations material may be glue, epoxy, solder, or any similar material.

Transfer of strain from a host (i.e., the device in our case) to the optical fiber in the axial direction occurs via interfacial shear stress. The relation between the axial stress in the fiber $\sigma_f(z)$ and shear stress at the interface $\tau_i(z)$ as a function of axial position z is as follows:

$$\frac{d\sigma(z)}{dz} = \frac{-2}{r_f}\tau_i(z) \quad (1)$$

The negative sign here indicates that to balance a rising tensile force (stress) along the fiber, shear stress in the opposite direction is required at the interface.

For a well-bonded interface, no slippage between the fiber and the surrounding material is present and the interfacial shear stress is in a form that would be described by continuum mechanics based on linear elastic, visco-elastic, plastic or visco-plastic relations. If slippage occurs, $\tau_i(z)$ is due to friction, and we have:

$|\tau_i(z)| \leq \mu |\sigma_r(z)|$ for $\sigma_r(z) < 0$ $\tau_i(z) = 0 |$ for $\sigma_r(z) \geq 0$ \quad (2)

where $\mu$ is the coefficient of friction and $\sigma_r(z)$ is the radial stress at the interface. The specific sign of $\tau_i(z)$ will be such as to oppose the motion of the fiber. The case that interests us is when a fiber is surrounded by a coating and friction is present, with possible slippage, between the coating and the fiber, whereas, at the outer interface (between the coating and the device) there is no slippage. This means that a good bond is present at the outer interface, or that clamping friction is large enough to prevent slippage there. Because the optical fiber has higher stiffness compared to the coating, the coating/fiber interface will have higher interfacial shear and radial stresses compared to interfaces radially further outward from the fiber, making this case the most relevant one to consider.

This relation above must be understood in light of the following points: (i) frictional stress is only present when resisting the relative displacement of the two surfaces, (ii) frictional stress requires that the interface be in a state of radial compression (otherwise the two surfaces will separate from each other and not make contact) (iii) the sign of the frictional stress is such as to oppose that relative motion, and (iv) the magnitude of the stress has a maximum (expressed in the relation) but can also be smaller and will be smaller if this frictional stress is not needed to prevent the sliding of the two surfaces relative to each other. In particular, what this means is that friction depends on the loading history.

The radial stress at the fiber/coating interface of a polyimide-coated optical fiber depends on the coating thickness, degree of cure, cure temperature and current (i.e., actual, or seen now) temperature. It also depends on the effect of the surrounding material (glue and embedment host material). The residual radial stress $\sigma_r^o$ in the coating following its cure during the fiber draw process would typically be between −5 MPa and −25 MPa (the negative sign indicates compression). Assuming this value to be uniform and be the only source of interfacial shear stress to the fiber, and applying Eq. (1) we have:

$$\frac{\sigma_f(L)}{l} = \frac{2}{r_f}\tau_m \quad (3)$$

where $\tau_m = -\mu\sigma_r^o$. [Note that $\sigma_f(0 \leq z \leq L) = \sigma_f(L)$ and that $\sigma_f(L+l) = 0$, which explains why the negative sign has been dropped in Eq. (3) compared to Eq. (2) above.] The length l is the transfer length but note that this assumes a monotonic build up of the frictional stress. This could be achieved, in our case, if the fiber was fully unstrained at time t=0 (i.e., the applied displacement was $w_L = 0$), and then $w_L$ was progressively increased monotonically to its current value. Note that in FIG. 3 the transfer length l increases $l_1, l_2, l_3$ with applied load. The areas under the curves 210, 220, 230 represent the total applied displacements $w_L$ (integral of strain over the total half-length of the fiber, from z=0 to ∞) in each case.

Figure 3:
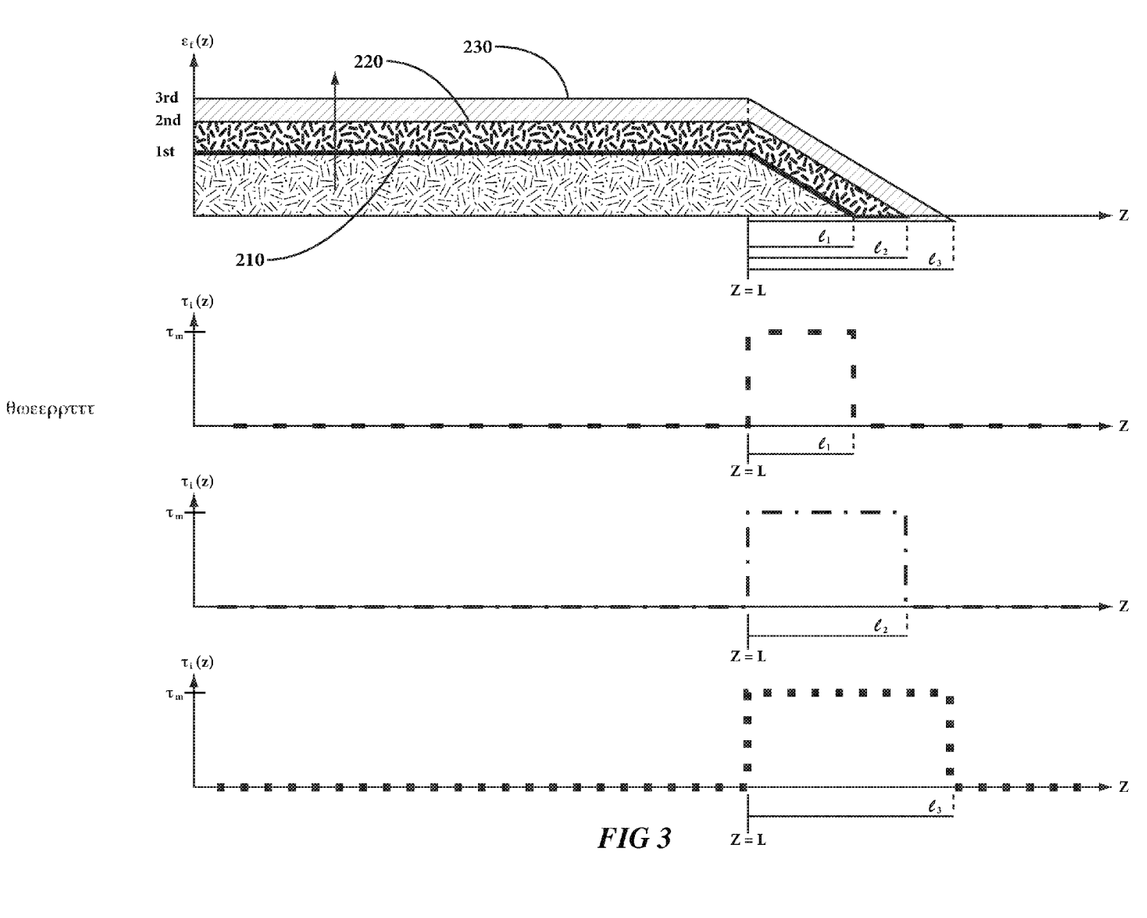
FIG. 3 illustrates strain transfer to an optical fiber during a monotonic increase in external displacement.
Figure 4:
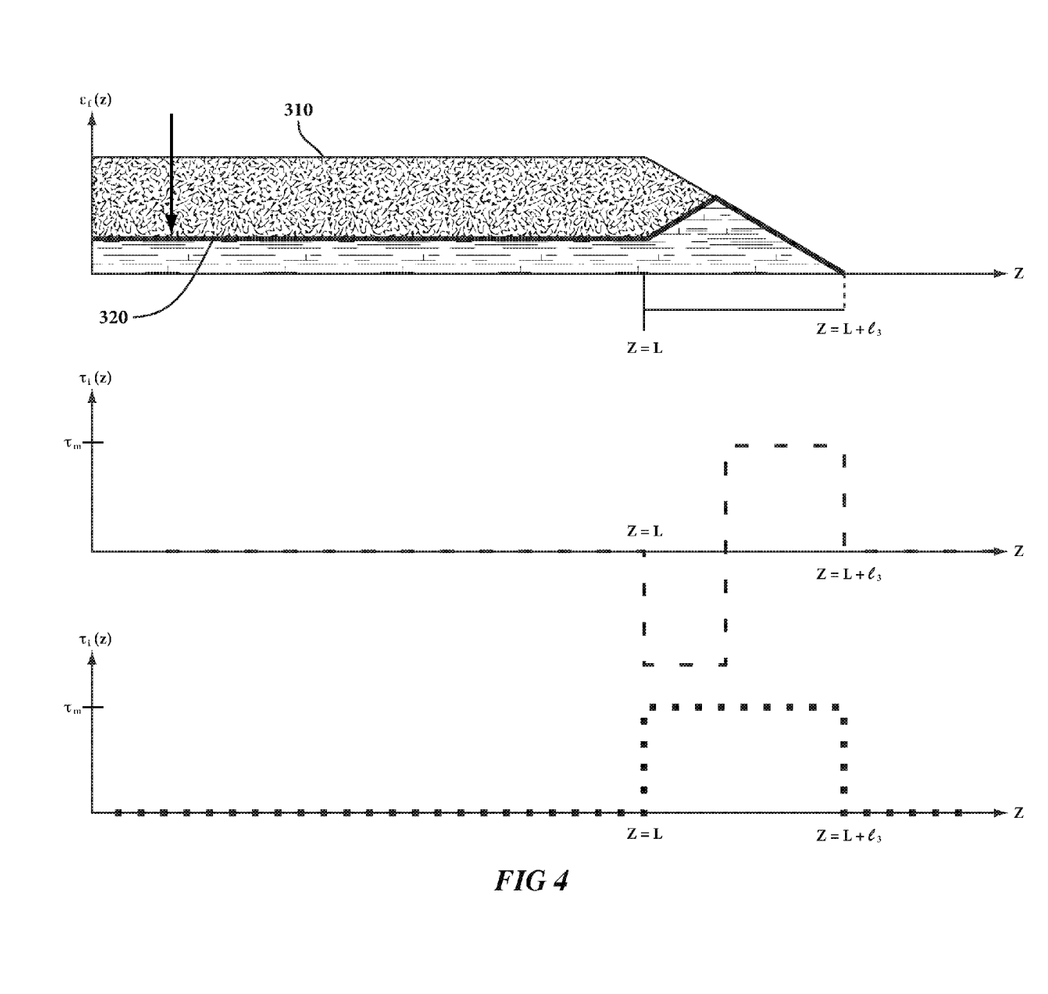
FIG. 4 illustrates strain transfer to an optical fiber during a decrease in external applied displacement.

If after the increase to $w_{L3}$ the displacement is reduced back to $w_{L1}$, it is difficult to know with certainty what will be the form of the strain profile. However, it is clear that the profile will not be that of FIG. 3. This is because there is necessarily a change in direction of the relative displacement between coating and fiber at the location where the fiber enters the bond (z=L). An extreme case of a possible profile is shown in FIG. 4. Here we see that the total zone where friction is present has not shrunk. Instead, the first part of the strain transfer occurs with stress in the opposite direction. The areas under the curve 310 and 320 again represent total displacement. (Curve 310 in FIG. 4 corresponds to the same instant as curve 230 in FIG. 3.) The requirement that the total area under the curve be equal to the total displacement must still be valid. This means that the strain in the region $0 \leq z \leq L$ will be lower than that seen when load had been increasing. This demonstrates how hysteresis occurs. Other distributions of the shear stress profile would be compatible with the same displacement and it may occur that upon reloading the total length contributing to the strain transfer will be longer than how it is represented in FIG. 3. This is at the origin of the walking effects that can occur with systems that rely on frictional strain transfer, resulting in the undesirable drift of the measured response for a given applied displacement under repeated cycling.

To further quantify these effects, we can define the concept of "effective depth of the hold" D which is defined mathematically as follows:

$$\varepsilon_f(L) = \frac{w_L}{L+D} \quad (4)$$

In other words, D is the length that, if the fiber was fully anchored at that depth along the support so that the strain transfer were immediate and full at that location, would result in the same strain in the fiber as currently seen in the region $z \leq L$. Since we also have:

$$\varepsilon_f(L) = \frac{w_L^f}{L} \quad (5)$$

where $w_L^f$ is the displacement at z=L (i.e., the area under the strain profile from z=0 to z=L) we get:

$$D = \frac{(w_L - w_L^f)}{\varepsilon_f(L)} \quad (6)$$

Graphically, $(w_L - w_L^f)$ is the area under the fiber strain curve from z=L to ∞. If we take a rectangle that has that area but with a height equal to $\epsilon_f(L)$, that rectangle would have a base equal to D, per our definition. We can also conceive D as representing how far beyond the z=L point a fixed anchor of the fiber would need to be in order to give the same strain response (in the region to the left of the support) as currently obtained for the applied $w_L$.

This D value then becomes a useful measure for the performance of the device because we want $D(w_L)$ to not vary over time, number of cycles, etc. In other words, if at calibration we had $D(w_L, t=t_{CAL})=D_{CAL}(w_L)$, then the following will be a measure of the drift over time:

$$\delta(w_L, t) = D(w_L, t) - D_{CAL}(w_L) \quad (7)$$

Furthermore, the relative error introduced because of this change will be:

$$Rel.Err. = \frac{\delta(w_L, t)}{L} \quad (8)$$

And what we want is to keep $|\delta(w_L,t)|/L$ as small as possible.

One way to keep $\delta(w_L,t)$ small is by achieving values of $|D(w_L,t)|$ as small as possible. This is the method used herein. In other words, the approach explained here shows how $|D(w_L,t)|$ will be smaller compared to when the invention is not used, therefore reducing the effects of hysteresis and cycle-to-cycle variations during repeated loadings.

How this is achieved is apparent when one first considers how a capstan works. Well known equations relate how a rope with tension $T_{load}$ on one side and which is wrapped an angle $\varphi_{hold}$ radians around a capstan will require a smaller force $(T_{hold})$ on the other side. The relation is:

$$T_{hold}(\varphi) = T_{load} \cdot e^{-\mu\varphi} \quad (9)$$

where μ is the coefficient of friction of the rope/capstan interface. In fact, if we know that the rope is not moving (the needed holding force is applied at angle $\varphi=\varphi_{hold}$), then the above relation expresses the decreasing tension along the fiber in the range $0 \leq \varphi \leq \varphi_{hold}$, the tension in the rope can be expressed as:

$$T_{rope}(\varphi) = T_{load} \cdot e^{-\mu\varphi} \quad (10)$$

having the property that $T_{rope}(\varphi=\varphi_{hold})=T_{hold}$ and $T_{rope}(\varphi=0)=T_{load}$, as expected.

The same relation applies if the fiber is the "rope". The tension in the fiber, divided by $\pi \cdot r_f^2$, is the axial stress $\sigma_f(\varphi)$. Expressed in terms of position s along the fiber, using $s=R_{capstan} \cdot \varphi$, the above relation becomes:

$$\sigma_f(s) = \sigma_{load} \cdot e^{-\mu \frac{s}{R_{capstan}}} \quad (11)$$

and at $s=s_{hold}(=R_{capstan}\varphi_{hold})$, we have: $\sigma_f(s=s_{hold})=\sigma_{hold}$ In practice, the radius of the capstan will be much larger than the radius of the optical fiber. This means that Eq. (1) will still hold when we use s as the position variable instead of z. To relate to our previous discussion, we make the following assignment:

$$s = z - L \quad (12)$$

The interfacial shear stress of the profile of Eq. (11) is obtained from Eq. (1) as:

$$\tau_i(s) = \mu \left(\frac{r_f}{2R_{capstan}}\right) \sigma_{load} e^{-\mu \frac{s}{R_{capstan}}} = \mu \left(\frac{r_f}{2R_{capstan}}\right) \sigma_f(s) \quad (13)$$

However, relations 11 and 13 assume that only the capstan effect is responsible for the friction between the capstan and the optical fiber. In our case, the capstan effect is additional to the frictional effect already present at the fiber/coating interface due to the residual stress in the coating. Furthermore, when the applied load is small, the interfacial shear stresses do not exceed the maximum interfacial shear stress that friction can provide and this means that the strain transfer behaves with no slippage the same as if a full chemical bond between the fiber and the coating were present.

The following description paints an approximate but reasonably accurate picture of the strain transfer starting for the case of no load and zero interfacial stress and monotonically increasing the load. At very low load, the interfacial shear stress is below the slip value and the strain transfer is linear elastic. In this elastic regime, the location along the fiber where the shear stress is maximum is very close to the s=0 location and the entire shear stress profile varies linearly with the applied load. The shear-lag model (see LeBlanc 2005) is frequently used to describe such strain transfer and it results in the following:

$$\sigma_f(s) = \sigma_{load}\left(1 - \exp\left(-\frac{ns}{r_f}\right)\right) \quad (14)$$

where n is a shear transfer coefficient that depends on the elastic properties of the device, the fiber, the coating and the bonding material used to hold these materials together. For a polyimide coating glued in a groove using epoxy of roughly the same elastic modulus as polyimide, we can use:

$$n = \sqrt{\frac{E_m}{(1+v_m)E_f \ln\left(\frac{R_{groove}}{r_f}\right)}} \quad (15)$$

where $E_m$ and $v_m$ are the Young's modulus and Poisson's ratio of the epoxy, and $R_{groove}$ is the half-width of the groove.

From Equation (1), the shear stress is:

$$\tau_i(s) = \frac{n\sigma_{load}}{2}\exp\left(-\frac{ns}{r_f}\right) \quad (16)$$

(This formula predicts that the interfacial shear stress is maximum at the s=0 point, which is a theoretical impossibility but in reality the maximum stress is very close to the fiber end so that the predicted result is still useful, and that this maximum is proportional to the applied tensile stress in the fiber.) With increasing load, there comes a load at which the maximum shear stress present is equal to the maximum shear stress that the residual friction can support $\tau_{max}^{el}=\mu|\sigma_r^0|$. This happens when $$\sigma_{load} = \frac{-2\mu\sigma_r^0}{n}$$

and this is also the onset of slippage. At that point, with increasing load, a zone with frictional shear stress grows from the s=0 position and the linear elastic profile shifts towards larger s values. Let s' be the distance beyond which the shear transfer is elastic. For s≥s' we have $$\tau_i(s) = -\mu\sigma_r^0 \exp\left(-\frac{n(s-s')}{r_f}\right) \quad (17)$$

The linear elastic region can be understood as providing the hold necessary for the capstan effect to take place. In the zone where friction is present 0≤s<s'), the shear stress has two components: first is the friction due to residual stress in the coating $-(\mu\sigma_r^0)$, and the second is that due to the capstan effect $$\mu\left(\frac{r_f}{2R_{capstan}}\right)\sigma_f(s),$$

as per Eq. (13).

In this point in our description, the value of the invention should be clear: the friction present by using a capstan is larger than would be without its use and, therefore, frictional strain transfer will occur over a shorter distance. Overall, the values of $D(w_L,t)$ will be lower than would be the case without the invention, which will causes error terms to be smaller (Eq. (7)).

The axial stress at s=s' can be seen as the effective "hold" force of the capstan effect and we write:

$$\sigma_{hold} = \frac{2\tau_{max}^{el}}{n} = \frac{-2\mu\sigma_r^0}{n} \quad (18)$$

In the zone 0≤s≤s', both the capstan and the residual stress act on the fiber to create friction. The axial stress profile in this zone takes the form:

$$\sigma_f(s) = \left(\sigma_{load} - \frac{2R_{capstan}\sigma_r^o}{r_f}\right)e^{\frac{-\mu \cdot s}{R_{capstan}}} + \frac{2R_{capstan}\sigma_r^o}{r_f} \quad (19)$$

and the interfacial shear stress is:

$$\tau_i(s) = \quad (20)$$
$$\mu\left(\sigma_{load}\left(\frac{r_f}{2R_{capstan}}\right) - \sigma_r^o\right)e^{\frac{-\mu \cdot s}{R_{capstan}}} = \left(\mu\left(\frac{r_f}{2R_{capstan}}\right)\sigma_f(s) - \mu\sigma_r^o\right)$$

The strain profile is therefore separated into three zones:
1. The suspended fiber, free of interfacial stress, in the zone −L≤s<0
2. The region when the capstan effect is active and the interfacial stress is described by Eq. (20), in the zone 0≤s≤s'
3. The region that behave with linear-elastic strain transfer s>s'

Figure 5:
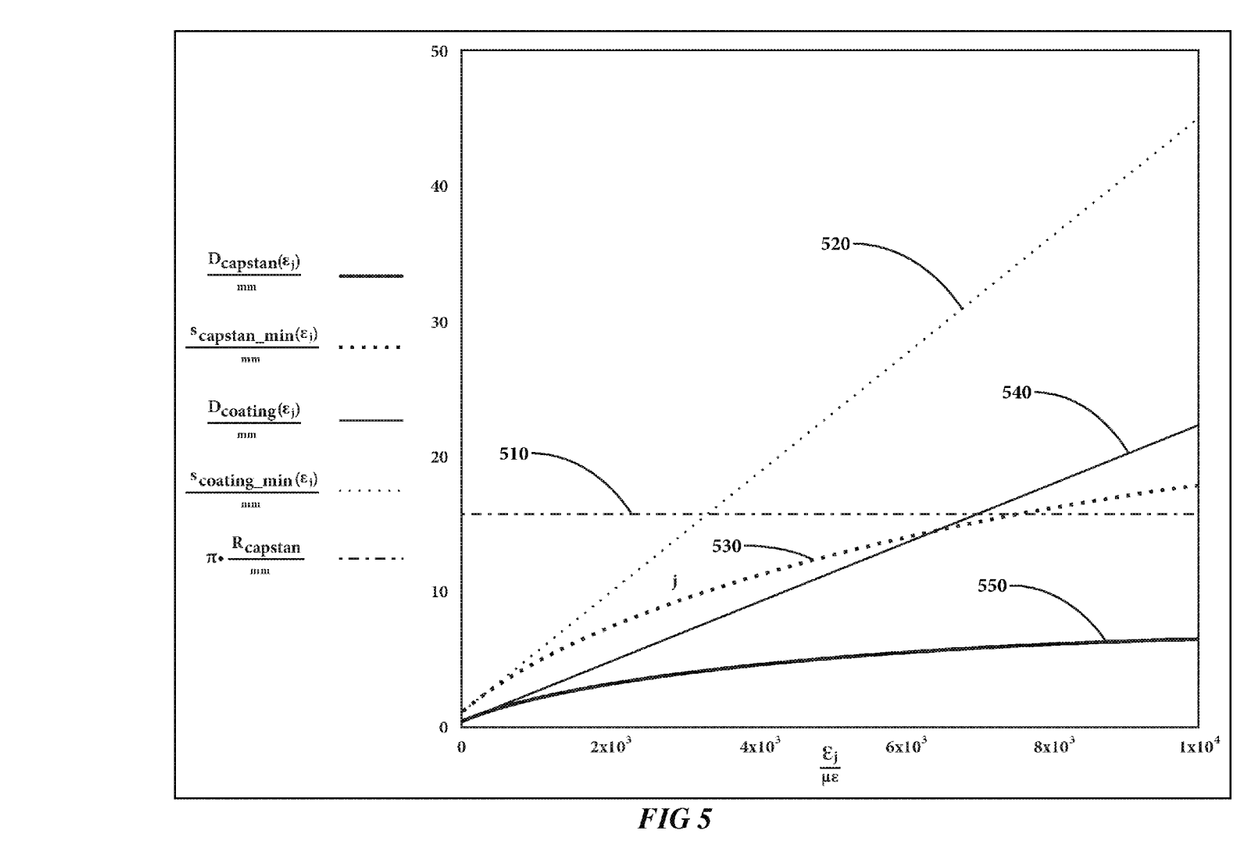
FIG. 5 is one strain transfer model for a polyimide coated fiber.
Figure 6:
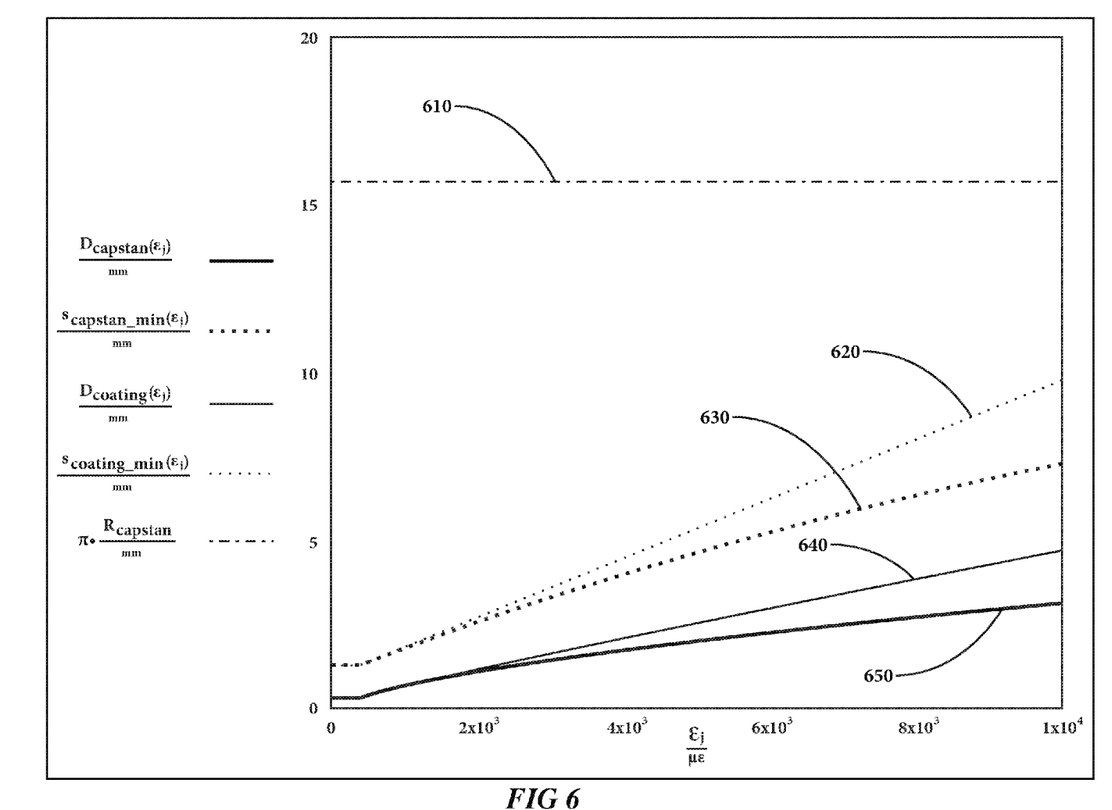
FIG. 6 is another strain transfer model for a polyimide coated fiber.

We now compare two cases: (1) the case where the coated optical fiber has its coating bonded directly to the strain support without the use of a capstan, and (2) the case when it is installed on a capstan. In both cases it is assumed that the coating can be chemically bonded to the support but that the coating/fiber interface is not chemically bonded (friction is present at that interface). For both cases, a linear elastic region (where the shear stress is smaller than $\tau_{max}^{el}$) will be present and have the same impact on the strain transfer. For the case without the capstan, the rest of the strain transfer occurs following Equation (1) with $\tau_i=\tau_{max}^{el}$. For the case with the capstan, the friction follows the form of Equation (20). Modeling of these cases confirms that D is smaller for the capstan-aided case but the degree of improvement depends on several parameters. The greatest reduction in D occurs for combinations where the coating is not able to provide much stress transfer on its own (for example, if radial compression at the coating/fiber interface is significantly reduced). Two separate comparisons are discussed below for illustration purposes:

FIGS. 5 and 6 illustrate strain transfer models results for polyimide-coated fibers. The key model parameters for FIG. 5 are p=0.5, $R_{capstan}$=5 mm, $2R_{coating}$=250 µm, $2r_f$=125 µm, $\tau_m$=0.5 MPa Curve 550 shows the "effective depth of the hold" (D) for the case of fiber bonded on a 10 mm diameter capstan (the wrap bond length corresponding to 180 degrees on the capstan is shown by horizontal line 510. The equivalent case for a straight-bonded fiber (no capstan effect) is provided by line 540. The minimum bond attachment length required for the capstan case is shown by line 530 and, in line 520 the bond length (coating to device) required for the straight bond case (without a capstan). In both cases, the attachment length corresponds to $$\frac{4r_f}{n}$$

(a conservative estimate of the length required for the linear elastic part of the strain transfer) plus the length over which friction is present (s' for the capstan case, l for the case without the capstan). The horizontal axis is $\epsilon_1$, the strain on the device (or "host" strain).

FIG. 6 is a further illustration of the effects with the same parameters as FIG. 5 except the residual radial frictional stress was $\alpha_r^0$=−1 MPa for FIG. 5 and is $\alpha_r^0$=−5 MPa for FIG. 6.

For FIG. 6 curve 650 shows the "effective depth of the hold" (D) for the case of fiber bonded on a 10 mm diameter capstan. The equivalent case for a straight-bonded fiber (no capstan effect) is provided by line 640. The minimum bond length required for the capstan case is shown by line 630 and, in line 620 the bond length required for the straight bond case is shown. Both of these use the same criteria as for FIG. 5. The half-turn bond length corresponding to 180 degrees on the capstan is shown by horizontal line 610. We see that, D with the capstan is still lower than D without a capstan ($D_{coating}$). However, the difference between the two cases is smaller than was the case in FIG. 5 because, in this case, the radial stress in the coating is higher.

Figure 7:
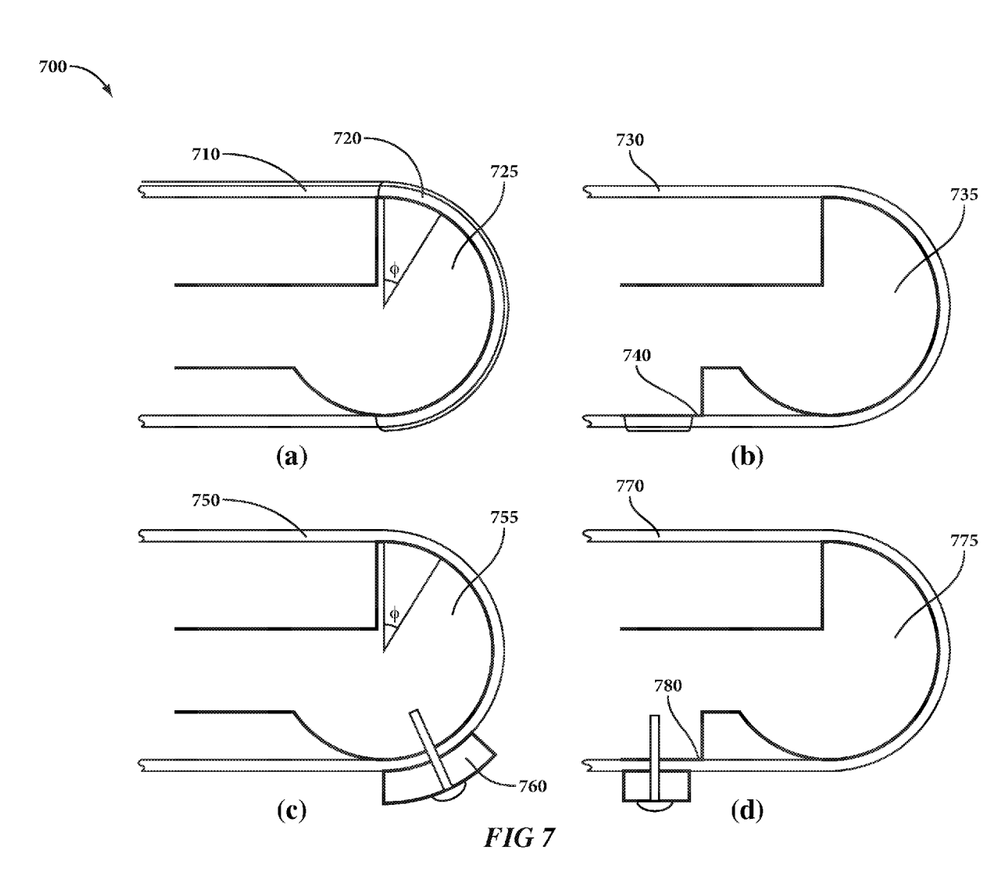
FIG. 7 illustrates variations of fiber mounted in a capstan support.

In FIG. 7 we see an optical fiber mounted in a capstan support in four different configurations. In (a) the fiber 710 is bonded by material 720 onto capstan 725 in the zone 0°≤φ≤180°. In (b) fiber 730 is bonded to a separate support 740 after being wrapped 180 degrees around capstan 735. In (c) the optical fiber 750 is being held on capstan 755 by a clamp 760 in the zone 135°≤φ≤180°. In (d) the optical fiber 770 is clamped to a separate support 780 after being wrapped 180 degrees around capstan 775.

Figure 8:
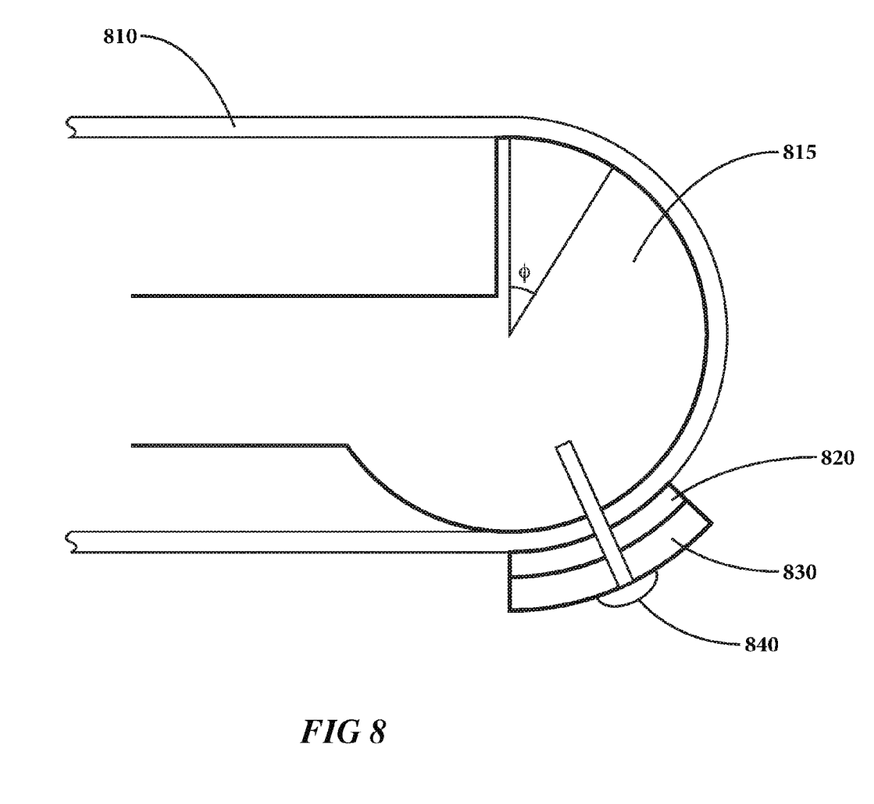
FIG. 8 illustrates a fiber held in a capstan support by a clamp with an interlayer material.

In FIG. 8 the fiber 810 held in the capstan 815 by a clamp applying a force on the coated fiber in the zone $135° \leq \varphi \leq 180°$. The clamp includes a clamp cover 830 and an interlayer material 820, the CTE and thickness of which can be selected to the thermal response of the clamp, and a mounting screw 840. Alternately, one can choose dimensions and materials for mounting screw 840 and clamp cover (with or without an interlayer) to optimize the thermal response of the clamp.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods or steps.

The invention claimed is:

1. An attachment method for mounting an optical fiber having a coating in tension on strain based sensing devices comprising:
   providing a semi-circular or cylindrical shape at either end of the optical fiber; mounting the optical fiber by wrapping the optical fiber 180 degrees around the semi-circular or cylindrical shape, from a starting point of zero degrees and continuing for 180 degrees:
   providing a separate force onto the optical fiber wrapped around the semi-circular or cylindrical shape to maintain the optical fiber in tension;
   wherein the separate force is provided by a clamp and mounting screw to hold the optical fiber with a transverse force onto the semi-circular or cylindrical shape and wherein the separate force is further provided by bonding the optical fiber onto the semi-circular or cylindrical shape using a bonding material.

2. The attachment method for mounting an optical fiber in tension on strain based sensing devices of claim 1 further providing that the location of the provided clamp covers up to the 180 degrees position around the semi-circular or cylindrical shape.

3. The attachment method for mounting an optical fiber in tension on strain based sensing devices of claim 1 further providing that the location of the provided clamp lies in a zone from 135 to 180 degrees around the semi-circular or cylindrical shape.

4. The attachment method for mounting an optical fiber in tension on strain based sensing devices of claim 1 further providing a clamp cover and an interlayer between the clamp and the semi-circular or cylindrical shape, said interlayer having a coefficient of thermal expansion (CTE) greater than a coefficient of thermal expansion of the clamp cover, and wherein the effective thermal expansion of the clamp in the transverse direction where the force is acting matches that of the optical fiber.

5. The attachment method for mounting an optical fiber in tension on strain based sensing devices of claim 1 further providing clamp and mounting screws having coefficient of thermal expansions (CTEs) and dimensions that are selected so that a clamp clamping force is preserved over the temperature range of operation of the device.

6. An attachment method for mounting an optical fiber having a coating in tension on strain based sensing devices comprising:
   a) providing a semi-circular or cylindrical shape at either end of the optical fiber; mounting the optical fiber by wrapping the optical fiber 180 degrees around the semi-circular or cylindrical shape, from a starting point of zero degrees and continuing for 180 degrees:
   b) providing a separate force onto the optical fiber wrapped around the semi-circular or cylindrical shape to maintain the optical fiber in tension;
   c) wherein the separate force is provided by bonding the optical fiber using a bonding material onto a support separate from the semi-circular or cylindrical shape after some length of optical fiber has been wrapped over the semi-circular or cylindrical shape, and wherein the separate force is provided by a clamp and mounting screw to hold the optical fiber with a transverse force onto the semi-circular or cylindrical shape.

7. An attachment method for mounting an optical fiber having a coating in tension on strain based sensing devices comprising:
   a) providing a semi-circular or cylindrical shape at either end of the optical fiber; mounting the optical fiber by wrapping the optical fiber 180 degrees around the semi-circular or cylindrical shape, from a starting point of zero degrees and continuing for 180 degrees:
   b) providing a separate force onto the optical fiber wrapped around the semi-circular or cylindrical shape to maintain the optical fiber in tension;
   c) wherein the separate force is provided by providing that a clamp and mounting screw is used to hold the optical fiber with a transverse force onto a separate support after some length of fiber has been wrapped over the semi-circular or cylindrical shape, and
   d) providing a clamp cover and an interlayer between the clamp and the separate support, said interlayer having a coefficient of thermal expansion (CTE) greater than a coefficient of thermal expansion of the clamp cover, and wherein the effective thermal expansion of the clamp in the transverse direction where the force is acting matches that of the optical fiber.

8. The attachment method for mounting an optical fiber in tension on strain based sensing devices of claim 7 further providing the clamp and the mounting screw having coefficient of thermal expansions (CTEs) and dimensions that are selected so that a clamp clamping force is preserved over the temperature range of operation of the device.

* * * * *